United States Patent
Jung et al.

(10) Patent No.: US 10,476,064 B2
(45) Date of Patent: Nov. 12, 2019

(54) SEPARATOR COMPRISING ADHESIVE COATING PARTS HAVING DIFFERENT TACK STRENGTHS AND ELECTRODE ASSEMBLY COMPRISING THE SAME

(71) Applicant: LG CHEM, LTD., Seoul (KR)

(72) Inventors: Sung Han Jung, Daejeon (KR); Ki Woong Kim, Daejeon (KR); Sung Pil Yoon, Daejeon (KR)

(73) Assignee: LG CHEM, LTD., Seoul (KR)

( * ) Notice: Subject to any disclaimer, the term of this patent is extended or adjusted under 35 U.S.C. 154(b) by 128 days.

(21) Appl. No.: 15/548,636

(22) PCT Filed: Sep. 2, 2016

(86) PCT No.: PCT/KR2016/009848
§ 371 (c)(1),
(2) Date: Aug. 3, 2017

(87) PCT Pub. No.: WO2017/039385
PCT Pub. Date: Mar. 9, 2017

(65) Prior Publication Data
US 2018/0034028 A1   Feb. 1, 2018

(30) Foreign Application Priority Data
Sep. 2, 2015   (KR) .................. 10-2015-0124059

(51) Int. Cl.
*H01M 2/16*   (2006.01)
*H01M 2/10*   (2006.01)
(Continued)

(52) U.S. Cl.
CPC ............ *H01M 2/166* (2013.01); *H01M 2/10* (2013.01); *H01M 2/145* (2013.01); *H01M 2/168* (2013.01);
(Continued)

(58) Field of Classification Search
None
See application file for complete search history.

(56) References Cited

U.S. PATENT DOCUMENTS 7,638,241 B2 * 12/2009 Lee ..................... H01M 2/14
429/129
2011/0159347 A1   6/2011 Shibano et al.
(Continued)

FOREIGN PATENT DOCUMENTS

EP       2 662 920 A2   11/2013
EP       2874203 A1    5/2015
(Continued)

OTHER PUBLICATIONS

English translation of Tomoaki et al KR 20130102498 obtained via Google Patent on Feb. 27, 2019 (Year: 2013).*
(Continued)

*Primary Examiner* — Sarah A. Slifka
(74) *Attorney, Agent, or Firm* — Birch, Stewart, Kolasch & Birch, LLP

(57) ABSTRACT

The present invention relates to a jelly-roll type electrode assembly comprising: a sheet-like positive electrode; a sheet-like negative electrode; and a separator which is interposed between the positive electrode and the negative electrode, and which includes a first adhesive coating part and a second adhesive coating part formed on a first surface of a sheet-like porous substrate, and a third adhesive coating part formed on a second surface which is the opposite surface to the first surface, wherein the first adhesive coating part and the second adhesive coating part have different tack strength from each other.

20 Claims, 2 Drawing Sheets

(51) Int. Cl.
  *H01M 10/052* (2010.01)
  *H01M 10/0587* (2010.01)
  *H01M 2/14* (2006.01)
  *H01M 10/04* (2006.01)
  *H01M 10/0525* (2010.01)

(52) U.S. Cl.
  CPC ..... *H01M 10/0431* (2013.01); *H01M 10/052* (2013.01); *H01M 10/0587* (2013.01); *H01M 10/0525* (2013.01); *Y02E 60/122* (2013.01); *Y02T 10/7011* (2013.01)

(56) References Cited

U.S. PATENT DOCUMENTS

| | | |
|---|---|---|
| 2013/0004817 A1 | 1/2013 | Lee et al. |
| 2014/0272505 A1 | 9/2014 | Yoon et al. |
| 2015/0140403 A1 | 5/2015 | Moon et al. |

FOREIGN PATENT DOCUMENTS

| | | |
|---|---|---|
| JP | 2008-108492 A | 5/2008 |
| JP | 2010-516855 A | 5/2010 |
| JP | 2010-244875 A | 10/2010 |
| JP | 2011-108443 A | 6/2011 |
| JP | 2014-511554 A | 5/2014 |
| KR | 10-2002-0011491 A | 2/2002 |
| KR | 10-2009-0051381 A | 5/2009 |
| KR | 10-2012-0079515 A | 7/2012 |
| KR | 10-2012-0108212 A | 10/2012 |
| KR | 10-2012-0134663 A | 12/2012 |
| KR | 10-2013-0102498 A | 9/2013 |
| KR | 10-2014-0065053 A | 5/2014 |
| KR | 10-2014-0082261 A | 7/2014 |
| KR | 10-2014-0113186 A | 9/2014 |
| WO | WO 99/48164 A1 | 9/1999 |

OTHER PUBLICATIONS

International Search Report issued in PCT/KR2016/009848 (PCT/ISA/210), dated Dec. 8, 2016.

Extended European Search Report, dated July12, 2019, for European Application No. 16842351.5.

* cited by examiner

10

20

200

SEPARATOR COMPRISING ADHESIVE COATING PARTS HAVING DIFFERENT TACK STRENGTHS AND ELECTRODE ASSEMBLY COMPRISING THE SAME

TECHNICAL FIELD

This application claims the benefit of priority based on Korean Patent Application No. 10-2015-0124059 filed on Sep. 2, 2015 with the Korean Intellectual Property Office, the disclosure of which is incorporated herein by reference in its entirety.

The present invention relates to a separator including adhesive coating parts having different tack strengths and an electrode assembly including the same.

BACKGROUND ART

Due to the rapid increase in the use of fossil fuels, the demand for the use of alternative energy and clean energy is increasing, and in a bid to meet the demand, the fields of electric power generation and electric energy storage using electric chemistry are most actively studied.

Secondary battery is a popular example of electrochemical devices utilizing such electrochemical energy, and its applications tend to expand gradually.

According to the shape of their cases, secondary batteries are classified into cylindrical batteries and prismatic batteries in which an electrode assembly is embedded in a cylindrical or rectangular metal can, and pouch-shaped batteries in which an electrode assembly is embedded in a pouch-shaped case constructed of an aluminum laminate sheet.

The electrode assembly embedded in the battery case is a chargeable and dischargeable power generation element formed of a lamination structure of a positive electrode/separator/negative electrode. The electrode assembly is classified into a jelly-roll type in which long-sheet type positive electrodes and long-sheet type negative electrodes coated with an active material are wound with separators interposed between the positive electrodes and the negative electrodes, and a stack type in which a plurality of positive electrodes and negative electrodes having a predetermined size are alternately stacked with interposed separators.

An advanced electrode assembly structure has been developed combining the jelly-roll type and the stack type into a stack/folding type electrode assembly formed by folding long continuous separator films along with a full cell of a predetermined unit size having a positive electrode/separator/negative electrode structure or a bicell of a predetermined unit size having a positive (or negative) electrode/separator/negative (or positive) electrode/separator/positive (or negative) electrode structure.

In addition, in order to improve the process performance of conventional stack type electrode assemblies and meet the demands for various types of secondary batteries, there has been developed a lamination/stack type electrode assembly having a structure formed by stacking unit cells in which electrodes are alternately stacked with separators into lamination.

On the other hand, the secondary battery repeatedly contracts and expands in the process of charging and discharging, which may generate a space between an electrode and a separator. With a space introduced between the electrode and the separator, lithium ions need to move further, increasing the internal resistance and deteriorating the overall performance of the secondary battery. Accordingly, there has been an attempt to use a separator provided with an adhesive coating layer having high tack strength in order to prevent the generation of space between the electrode and the separator.

This approach could increase an adhesion between the electrode and the separator of the secondary battery for improvement in the life expectancy and the high rate charge/discharge characteristics of the secondary battery. However, when applied to electrode assemblies requiring winding of the separator in the manufacturing process, the conventional method causes one end of the electrode assembly to be stuck to a winding core during their subsequent separation, which is called "tail out condition," resulting in increased cases of defective appearance of the electrode assembly.

Therefore, there is a high demand for a technology capable of increasing the productivity of the electrode assembly while improving the life expectancy and high-rate charge/discharge characteristics of the secondary battery.

DETAILED DESCRIPTION OF THE INVENTION

Technical Problem

The present invention in some embodiments seeks to resolve the above-described deficiencies of the prior art and the technical issues long outstanding in the art.

The inventors of the present application have conducted intensive researches and various experiments on electrode assemblies, and found that, as described later, incorporating a separator formed of a sheet-like porous substrate having a first adhesive coating part and a second adhesive coating part with different tack strengths can increase the production yield of the secondary battery while improving its life expectancy and the high rate charging/discharging characteristics. The illustrative embodiments of the present disclosure are based on such finding.

Technical Solution

According to embodiments of the present invention, there is provided a jelly-roll type electrode assembly, including a positive electrode in a sheet-like form, a negative electrode in a sheet-like form, and a separator which is interposed between the positive electrode and the negative electrode and which includes a first adhesive coating part and a second adhesive coating part formed on a first surface of a sheet-like porous substrate, and a third adhesive coating part formed on a second surface which is the opposite surface to the first surface, wherein the first adhesive coating part and the second adhesive coating part have different tack strengths from each other.

The jelly-roll type electrode assembly is wound with a winding core brought in contact with a part of the separator during in the manufacturing process. At this time, in the case of winding with the winding core being in contact with the adhesive coating part having a relatively low tack strength, the tail out condition can be prevented, thereby reducing the defective appearances, and ultimately increase the production yield.

The secondary battery can be improved in longevity and the high rate charging/discharging characteristics by increasing an adhesive force with the electrode at the part of the separator excluding the part contacting with the winding core. Therefore, the adhesive coating part having a relatively high tack strength can be configured to face the electrode.

In one specific example, the area of the separator may be relatively large compared to the area of the positive electrode and the negative electrode.

In detail, the area of the separator can be equal to or larger than the area of the second adhesive coating part, compared to the area of the positive electrode and the negative electrode.

In addition, the first adhesive coating part may be wound in a state of being adhered onto the surface opposite to the negative electrode, and the second adhesive coating part may be wound by the separator itself while forming the winding tip of the electrode assembly.

The third adhesive coating part may have a structure in which it is wound in a state of being adhered onto the surface opposite to the positive electrode.

That is, the first adhesive coating part and the third adhesive coating part are positioned so as to face the electrode, and the second adhesive coating part which does not face the electrode is positioned so as to face the winding core in the winding process. The second adhesive coating part which does not face the electrode is wound only by the separator itself and forms a winding tip end which is preferentially wound on the first adhesive coating part and the third adhesive coating part in the winding process. Due to the structure including such a winding tip, the winding stability can be further improved.

In one specific example, the electrode assembly may have a structure in which it is wound so that, based on the separator, the negative electrode is positioned on the inner surface side of the separator With this structure, the positive electrode having relatively high stability against external impacts can be positioned on the outer surface of the electrode assembly, thereby improving the stability of the secondary battery.

Meanwhile, the first adhesive coating part may have a relatively high tack strength as compared to the second adhesive coating part.

The first adhesive coating part includes a first pressure sensitive adhesive, the second adhesive coating part includes a second pressure sensitive adhesive, and the first pressure sensitive adhesive and the second pressure sensitive adhesive may be different from each other.

In one specific example, the first pressure sensitive adhesive may be an acrylate-based pressure sensitive adhesive, and the second pressure sensitive adhesive may be a fluorine-based pressure sensitive adhesive.

The acrylate-based pressure sensitive adhesive generally has higher tack strength than the fluorine-based pressure sensitive adhesive, and therefore, the difference in the tack strength between the first adhesive coating part and the second adhesive coating part may be caused by the difference in the type of these pressure sensitive adhesives.

For example, the acrylate-based pressure sensitive adhesive may be a polymer of a monomer mixture containing i) 50 to 90% by weight of a (meth)acrylic acid ester monomer having an alkyl group having 1 to 14 carbon atoms, ii) 1 to 40% by weight of one or more monomers selected from the group consisting of allyl esters, vinyl esters, unsaturated acetate and unsaturated nitrile, and iii) 0.5 to 20% by weight of one or more monomers selected from the group consisting of unsaturated carboxylic acids, based on the total weight of the monomer mixture.

In one specific example, the monomer of i) may be at least one selected from the group consisting of methyl(meth) acrylate, ethyl(meth)acrylate, propyl(meth)acrylate, isopropyl(meth)acrylate, butyl(meth)acrylate, isobutyl acrylate, t-butyl methacrylate, pentyl methacrylate, hexyl methacrylate, heptyl acrylate, isooctyl acrylate, octyl methacrylate, 2-ethylhexyl(meth)acrylate, isodecyl acrylate, decyl methacrylate, dodecyl methacrylate, isobornyl methacrylate and lauryl(meth)acrylate, and more specifically, it may be included in an amount of 50 to 90% by weight, based on the total weight of the monomer mixture.

When the monomer of i) is contained in an amount of less than 50% by weight based on the total weight of the monomer mixture, it is impossible to secure the initial tack strength of the acrylate-based pressure sensitive adhesive. When the amount exceeds 90% by weight, the transfer of the pressure sensitive adhesive to the adherend occurs largely during its removal after used, which is not preferable.

In addition, the number of carbon atoms of the alkyl group of i) can be specifically in a range of 1 to 14, more specifically, in the range of 2 to 14. When it is less than 1, the cohesive force of the pressure sensitive adhesive decreases, and when the number of carbon atoms exceeds 14, the acrylate-based pressure sensitive adhesive becomes so flexible, resulting in a decrease in the tack property, which is not preferable.

In one specific example, the monomer of ii) above may be one or more selected from the group consisting of vinyl acetate, vinyl butanoate, vinyl propionate, vinyl laurate, vinyl pyrrolidone, acrylonitrile and methacrylonitrile, and specifically, vinyl acetate, vinyl butanoate, or acrylonitrile.

The monomer of ii) may be contained in an amount of 1 to 40% by weight, more specifically 7 to 25% by weight based on the total weight of the monomer mixture. When the amount of the monomer is less than 1% by weight, the acrylate-based pressure sensitive adhesive is too soft to ensure sufficient tack properties. When the amount exceeds 40% by weight, the acrylate-based pressure sensitive adhesive becomes excessively durable and thus the tack strength remarkably decreases, which is not preferable.

In one specific example, the monomer of iii) may be at least one selected from the group consisting of acrylic acid, itaconic acid, maleic anhydride, fumaric acid, crotonic acid, methacrylic acid, and ethylmethacrylic acid.

The monomer of iii) may be contained in an amount of 0.5 to 20% by weight based on the total weight of the mixture. When the amount of the monomer is less than 0.5% by weight, the acrylate-based pressure sensitive adhesive is too flexible to ensure sufficient tack properties. When the amount exceeds 20% by weight, the acrylate-based pressure sensitive adhesive becomes excessively durable and thus the tack strength remarkably decreases, which is not preferable.

The monomer mixture may further contain other monomers and crosslinking agents as needed. In one specific example, the monomer mixture further includes a crosslinking agent. The crosslinking agent is contained in an amount of from 0.1 to 3% by weight based on the total weight of the monomer mixture. When the amount of the crosslinking agent is within this range, the acrylate-based pressure sensitive adhesive has sufficient cohesive force.

The crosslinking agent is added to reinforce the cohesive force of the acrylate-based pressure sensitive adhesive. In one specific example, the crosslinking agent may be a compound containing 5 to 15 alkylene oxide groups and having an acrylate group or a vinyl group. In particular, it may be a compound containing 6 to 12 alkylene oxide groups and having an acrylate group or a vinyl group. Within the above range, the crosslinking agent provides excellent room temperature aging tackiness and stability.

For reference, the number of the alkylene oxide groups means the average number of alkylene oxide groups contained in the crosslinking agent used, and when the crosslinking agent contains less than 5 alkylene oxide groups, the produced pressure sensitive adhesive becomes more durable than necessary and thus the initial tack strength is lowered. When the crosslinking agent contains more than 15 alkylene oxide groups, the produced pressure sensitive adhesive becomes more flexible than necessary and so the tack properties decreases, which is not preferable.

In one specific example, the crosslinking agent may be at least one selected from the group consisting of an organic crosslinking agent such as polyethylene glycol diacrylate, polypropylene glycol diacrylate, 1,6-hexanediol diacrylate, trimethylolpropane triacrylate, ethoxylated trimethylpropane triacrylate, tripropylene glycol diacrylate, 1,3-butanediol diacrylate, pentatrytol triacrylate, 3-trimethoxysilylpropyl methacrylate, vinyltrimethoxysilane and divinylbenzene, and inorganic crosslinking agents such as aluminum acetyl acetonate, zinc acetate, zirconium carbonate, and the like, and specifically may be at least one selected from the group consisting of polyethylene glycol diacrylate and polypropylene glycol diacrylate.

In one specific example, the monomer mixture may further contain an epoxy group-containing unsaturated monomer, and the epoxy group-containing unsaturated monomer specifically includes glycidyl (meth)acrylate, alpha methyl glycidyl(meth)acrylate, allyl glycidyl ether, oxocyclohexyl (meth)acrylate, 3,4-epoxy cyclohexyl methyl (meth)acrylate. More particularly, it may be glycidyl (meth)acrylate or allyl glycidyl ether.

The epoxy group-containing unsaturated monomer may be contained in an amount of 0.1 to 3% by weight based on the total weight of the monomer mixture, and within the above range, the pressure sensitive adhesive composition provides sufficient cohesive force.

Meanwhile, the fluorine-based pressure sensitive adhesive may be, for example, polyvinylidene fluoride (PVdF).

In one specific example, the third adhesive coating part may include a third pressure sensitive adhesive, and the third pressure sensitive adhesive may be an acrylate-based pressure sensitive adhesive. Since the third adhesive coating part faces the electrode and requires high tack strength, it is advantageous to use an acrylate-based pressure sensitive adhesive having high tack strength.

More specifically, the third pressure sensitive adhesive may be the same as the first pressure sensitive adhesive, and when the same kind of pressure sensitive adhesive is used, there is an advantage that the number of the pressure sensitive adhesive to be used can be reduced so that the process can be simplified and the cost of the raw material can be reduced.

Meanwhile, the first adhesive coating part, the second adhesive coating part, and the third adhesive coating part may include inorganic particles and a pressure sensitive adhesive to improve the thermal stability of the separator.

In one specific example, the first adhesive coating part, the second adhesive coating part, and the third adhesive coating part may include 10 to 90% by weight, particularly 20 to 80% by weight of inorganic particles, based on the total weight of the respective parts. When the content of the inorganic particles is less than 10% by weight, it is difficult to improve the thermal stability of the separator, and the pore size and porosity due to the reduction of void spaces formed between the inorganic particles may be reduced and thereby the performance of the final battery is deteriorated. When the content of the inorganic particles is more than 90% by weight, the tack strength of the adhesive coating part may be lowered, and the lifetime characteristics and the high rate charge/discharge characteristics may be deteriorated, and raw material costs may be increased.

The tack strength of the adhesive coating parts can be adjusted by adjusting the contents of the inorganic particles and the pressure sensitive adhesive, and in one specific example, the second adhesive coating part, the content of the inorganic particles may be relatively high as compared to the first adhesive coating part.

In one specific example, the inorganic particles can be at least one selected from the group consisting of inorganic particles having piezoelectricity and inorganic particles having lithium ion transferring capability.

The inorganic particles having piezoelectricity mean a non-conductive material at normal pressure, but a material having electrical conductivity due to a change in internal structure when a predetermined pressure is applied. These particles exhibit high dielectric characteristics including a dielectric constant of 100 or more. When the inorganic particles having piezoelectricity are stretched or compressed by applying a predetermined pressure, they generate electric charges, and one side thereof is positively charged and the other side thereof is negatively charged, thus causing a potential difference between both sides.

In the case of using the inorganic particles having the above-mentioned characteristics, when an internal short-circuit of both electrodes occurs due to an external impact such as a needle-like conductor, not only the positive electrode and the negative electrode are in direct contact with each other due to the inorganic particles, but also the potential difference in the particles is generated due to the piezoelectricity of the inorganic particles. As a result, electrons move between the both electrodes, that is, a fine current flows, so that the battery voltage can be reduced and the safety can be improved.

Examples of the inorganic particles having piezoelectricity include at least one selected from the group consisting of $BaTiO_3$, PZT ($Pb(Zr,Ti)O_3$), PLZT ($Pb_{1-x}La_xZr_{1-y}Ti_yO_3$, $0<x<1$, $0<y<1$), PMN-PT ($PB(Mg_3Nb_{2/3})O_3$—$PbTiO_3$), hafnium oxide ($HfO_2$), but are not limited thereto.

The inorganic particles having a lithium ion transferring capability refer to inorganic particles containing a lithium element, but having a function of migrating lithium ions without preserving lithium. Since inorganic particles having a lithium ion transferring capability allow lithium ions to transfer and move by a kind of defect existing inside the particle structure, the lithium ion conductivity in the battery is improved, whereby the battery performance can be improved.

Examples of the inorganic particles having a lithium ion transferring capability may include at least one selected from the group consisting of lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), ($LiAlTiP)_xO_y$, series glass ($0<x<4$, $0<y<13$), lithium lanthanum titanate ($Li_xLa_yTiO_3$, $0<x<2$, $0<y<3$), lithium germanium thiophosphate ($Li_xGe_yP_zSy_w$, $0<x<4$, $0<y<1$, $0<z<1$, $0<w<5$), lithium nitride ($Li_xN_y$, $0<x<4$, $0<y<2$), $SiS_2$ ($Li_xSi_yS_z$, $0<x<3$, $0<y<2$, $0<z<4$) series glass and $P_2S_5$ ($Li_xP_yS_z$, $0<x<3$, $0<y<3$, $0<z<7$) series glass, but are not limited thereto.

In addition to the inorganic particles and the pressure sensitive adhesive, the adhesive coating parts may further include other additives commonly known in the art.

In one example, the adhesive coating part may further include a thickening agent. The thickening agent is not particularly limited as long as it is a substance capable of increasing viscosity without causing chemical change. For example, an acrylic polymer and a cellulose-based polymer can be used. The acrylic polymer may include polyvinylpyrrolidone (PVP) or polyvinyl alcohol (PVA), and the cellulose-based polymer may include hydroxyethyl cellulose (HEC), hydroxy propyl cellulose (HPC), ethylhydroxyethyl cellulose (EHEC); methyl cellulose (MC), carboxymethyl cellulose (CMC), and hydroxyalkyl methyl cellulose.

In one specific example, the thickness of the adhesive coating parts may be 2 μm to 20 μm, particularly 4 μm to 10 μm. When the thickness is less than 2 μm, the effect of improving the stability of the electrode assembly is insufficient. When the thickness is more than 20 μm, the energy density of the electrode assembly may be lowered, and the problem may arise that adhesive coating parts may be easily detached from a separation film.

Meanwhile, the porous substrate may be a polyolefin-based film commonly used in the art, and for example, it may be a sheet made of at least one selected from the group consisting of a high density polyethylene, a low density polyethylene, a linear low density polyethylene, a ultrahigh molecular weight polyethylene, a polypropylene, a polyethylene terephthalate, a polybutyleneterephthalate, a polyester, a polyacetal, a polyamide, a polycarbonate, a polyimide, a polyetheretherketone, a polyethersulfone, a polyphenyleneoxide, a polyphenylenesulfidro, a polyethylenenaphthalene and mixtures thereof.

The pore size and porosity of the porous substrate are not particularly limited, but the porosity may be in the range of 10 to 95% and the pore size (diameter) may be 0.1 to 50 μm. When the pore size and the porosity are less than 0.1 μm and less than 10%, it acts as a resistive layer. When the pore size is more than 50 μm and the porosity is more than 95%, it becomes difficult to maintain the mechanical properties.

The present invention also provides a separator for a jelly-roll type electrode assembly, including a sheet-Ike porous substrate, a first adhesive coating part and a second adhesive coating part formed on a first surface of the sheet-like porous substrate, and a third adhesive coating part formed on a second surface which is the opposite surface to the first surface, wherein the first adhesive coating part and the second adhesive coating part have different tack strengths from each other.

The present invention relates to a method of preparing a jelly-roll type electrode assembly, comprising:

(a) a step of preparing a separator including a first adhesive coating part and a second adhesive coating part formed on a first surface of a sheet-like porous substrate, and a third adhesive coating part formed on a second surface which is the opposite surface to the first surface, wherein the first adhesive coating part and the second adhesive coating part with different tack strengths from each other, (b) a step of stacking a positive electrode, a separator and a negative electrode so that the first adhesive coating part is positioned to face the negative electrode and the third adhesive coating part is positioned to face the positive electrode through a winding process, (c) winding the second adhesive coating part with a winding core brought in contact with the second adhesive coating part; and (d) separating the jelly-roll type electrode assembly from the winding core.

The present invention further provides a secondary battery in which an electrode assembly is embedded in a battery case together with an electrolytic solution.

Hereinafter, other components of the secondary battery will be described.

The electrode is collectively referred to as a negative electrode and a positive electrode. For example, the positive electrode can be produced, for example, by coating a positive electrode mixture mixed with a positive electrode active material, a conductive material and a binder onto a positive electrode current collector. If necessary, a filler can be added to the positive electrode mixture.

The positive electrode current collector is generally produced with a thickness of 3 to 201 μm, and is not particularly limited as long as it has high conductivity without inducing chemical change in the battery. For example, one selected from those obtained by surface-treating with carbon, nickel, titanium or silver onto the surface of stainless steel, aluminum, nickel, titanium, and aluminum or stainless steel can be used. Particularly, aluminum can be used and the current collector can form fine irregularities on its surface to improve the adhesive force of the positive electrode active material and can take various forms such as films, sheets, foils, nets, porous bodies, foams, nonwoven fabrics and the like.

The positive electrode active material may include, for example, a layered compound such as lithium cobalt oxide ($LiCoO_2$) or lithium nickel oxide ($LiNiO_2$) or a compound substituted with one or more transition metals; lithium manganese oxides such as formula $Li_{1+x}Mn_{2-x}O_4$ (where x is 0 to 0.33), $LiMnO_3$, $LiMn_2O_3$, $LiMnO_2$; lithium copper oxide ($Li_2CuO_2$); vanadium oxides such as $LiV_3O_8$, $LiV_3O_4$, $V_2O_5$, $Cu_2V_2O_7$; Ni-site type lithium nickel oxide represented by the formula $LiNi_{1-x}M_xO_2$ (where M=Co, Mn, Al, Cu, Fe, Mg, B or Ga, and x=0.01 to 0.3); lithium manganese composite oxide represented by the formula $LiMn_{2-x}M_xO_2$ (where M=Co, Ni, Fe, Cr, Zn or Ta, x=0.01 to 0.1) or $Li_2Mn_3MO_8$ (where M=Fe, Co, Ni, Cu or Zn); $LiMn_2O_4$ in which a part of Li in the formula is substituted with an alkaline earth metal ion; disulfide compounds; $Fe_2(MoO_4)_3$, and the like, but are not limited thereto.

The conductive material is usually added in an amount of 1 to 30% by weight based on the total weight of the positive electrode material mixture containing the positive electrode active material. Such a conductive material is not particularly limited as long as it has electrical conductivity without causing a chemical change in the battery, and examples thereof include graphite such as natural graphite and artificial graphite; carbon black such as carbon black, acetylene black, ketjen black, channel black, furnace black, lamp black, and summer black; conductive fibers such as carbon fiber and metal fiber; metal powders such as carbon fluoride, aluminum, and nickel powder; conductive whiskey such as zinc oxide and potassium titanate; conductive metal oxides such as titanium oxide; conductive materials such as polyphenylene derivatives; and the like.

The binder contained in the positive electrode is a component that assists in bonding between an active material and a conductive material and in binding to a current collector. The binder may be typically added in an amount of 1 to 30% by weight based on the total weight of a mixture containing a positive electrode active material. Examples of such binders include, but are not limited to, polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene terpolymer (EPDM), sulfonated EPDM, styrene-butadiene rubber, fluorine rubber, various copolymers, and the like.

The filler is optionally used as a component to inhibit the expansion of the positive electrode, and is not particularly limited as long as it is a fibrous material without causing any chemical change in the battery. Examples of the filler include olefin-based polymers such as polyethylene and polypropylene; fibrous materials such as glass fibers and carbon fibers are used.

Meanwhile, the negative electrode may be produced by coating a negative electrode mixture containing a negative electrode active material, a conductive material, and a binder onto a negative electrode collector, and a filler or the like may be further optionally included in the negative electrode.

The negative electrode current collector is not particularly limited as long as it has conductivity without causing a chemical change in the battery. For example, it may be formed of copper, stainless steel, aluminum, nickel, titanium, fired carbon, copper or stainless steel surface treated with carbon, nickel, titanium, silver or the like, an aluminum-cadmium alloy, or the like.

In addition, similarly to the positive electrode current collector, fine unevenness may be formed on the surface to enhance the adhesive force of the negative electrode active material, and it may be used in various forms such as a film, a sheet, a foil, a net, a porous body, a foam, and a nonwoven fabric.

In the present invention, the thickness of the negative electrode current collector may be the same within the range of 3 to 201 μm, but they may have different values depending on the case.

Examples of the negative electrode active material include carbon such as non-graphitized carbon and graphite-based carbon; metal complex oxides such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, Group 1, Group 2 and Group 3 elements of the Periodic Table, halogen; $0 < x \leq 1$; $1 \leq y \leq 3$; $1 \leq z \leq 8$); lithium metal; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; Li—Co—Ni-based materials and the like.

The electrolytic solution may be a lithium salt-containing non-aqueous electrolyte, and the lithium salt-containing non-aqueous electrolyte is composed of a nonaqueous electrolyte and a lithium salt. The non-aqueous electrolyte includes a non-aqueous organic solvent, an organic solid electrolyte, an inorganic solid electrolyte, and the like, but the present invention is not limited thereto.

Examples of the non-aqueous organic solvent may include aprotic organic solvent such as N-methyl-2-pyrrolidinone, propylene carbonate, ethylene carbonate, butylene carbonate, dimethyl carbonate, diethyl carbonate, gamma-butyrolactone, 1,2-dimethoxyethane, tetrahydroxyfuran, 2-methyltetrahydrofuran, dimethylsulfoxide, 1,3-dioxolane, formamide, dimethylformamide, dioxolane, acetonitrile, nitromethane, methyl formate, methyl acetate, triester phosphate, trimethoxymethane, dioxolane derivatives, sulfolane, methylsulfolane, 1,3-dimethyl-2-imidazolidinone, propylene carbonate derivatives, tetrahydrofuran derivatives, ether, methyl pyrophosphate, ethyl propionate and the like.

Examples of the organic solid electrolyte include a polyethylene derivative, a polyethylene oxide derivative, a polypropylene oxide derivative, a phosphate ester polymer, a poly agitation lysine, a polyester sulfide, a polyvinyl alcohol, polyvinylidene fluoride, a polymer containing an ionic dissociation group, and the like.

Examples of the inorganic solid electrolyte include nitrides, halides, sulfates or the like of Li such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, $Li_3PO_4$—$Li_2S$—$SiS_2$ or the like.

The lithium salt is a substance that is readily soluble in the non-aqueous electrolyte, and example thereof include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, chloroborane lithium, lower aliphatic carboxylic acid lithium, lithium tetraphenyl borate, imide and the like.

In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the non-aqueous electrolyte. In some cases, in order to impart incombustibility, the electrolyte may further include a halogen-containing solvent such as carbon tetrachloride and ethylene trifluoride. In addition, in order to improve high-temperature storage characteristics, the electrolyte may further include carbon dioxide gas, fluoro-ethylene carbonate (FEC), propene sultone (PRS), or the like.

In one specific example, a lithium salt such as $LiPF_6$, $LiClO_4$, $LiBF_4$, $LiN(SO_2CF_3)_2$ or the like can be added to a mixed solvent of a cyclic carbonate of EC or PC which is a high-dielectric solvent and a linear carbonate of DEC, DMC or EMC which is a low viscosity solvent to prepare a lithium salt-containing nonaqueous electrolyte.

Further, the present invention provides a battery pack including such a secondary battery as a unit cell, and a device including such a battery pack as a power source.

The device may be, for example, a notebook computer, a netbook, a tablet PC, a mobile phone, an MP3, a wearable electronic device, a power tool, an electric vehicle (EV), a hybrid electric vehicle (HEV), a plug-in hybrid electric vehicle (PHEV), an electric bicycle (E-bike), an electric scooter (E-scooter), an electric golf cart or an electric power storage system, but the present invention is not limited thereto.

Since the structure and manufacturing method of such a device are well known in the art, a detailed description thereof will be omitted herein.

DETAILED DESCRIPTION OF THE EMBODIMENTS

Hereinafter, embodiments of the present invention will be described with reference to the accompanying drawings. However, these embodiments are provided to facilitate a better understanding of the present invention and the scope of the present invention is not limited thereto.

Figure 1:
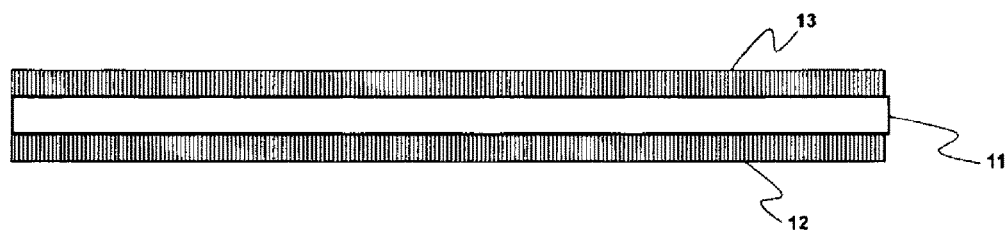
FIG. 1 schematically shows a vertical cross-sectional view of a general sheet-like separator, FIG. 2 schematically shows a vertical cross-sectional view of a separator used for manufacturing a jelly-roll type electrode assembly according to one embodiment of the present invention.

FIG. 1 schematically shows a vertical cross-sectional view of a general sheet-like separator.

Referring to FIG. 1, the separator 10 includes a porous substrate 11 and adhesive coating parts 12 and 13.

Specifically, the adhesive coating part 12 is formed overall on the lower surface of the long sheet-like porous substrate 11, and the adhesive coating part 13 is formed overall on the upper surface of the porous substrate 11.

Generally, the adhesive coating part 12 and the adhesive coating part 13 are configured to have the same tack strength.

Figure 2:
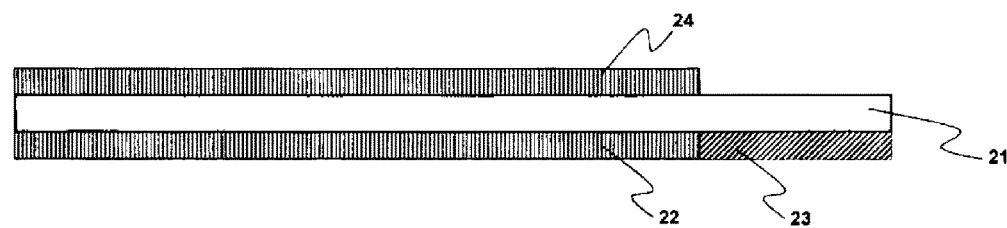

FIG. 2 schematically shows a vertical cross-sectional view of a separator used for manufacturing a jelly-roll type electrode assembly according to at least one embodiment of the present invention.

Referring to FIG. 2, the separator 20 includes a porous substrate 21 and adhesive coating parts 22, 23 and 24.

Specifically, the adhesive coating part 22 and the adhesive coating part 23 are formed on the lower surface of a long sheet-like porous substrate 21. The adhesive coating part 22 is formed on a left section of the lower surface of the porous substrate 21, and the adhesive coating part 23 is formed on a right section of the lower surface of the porous substrate. In addition, the adhesive coating part 23 and the adhesive coating part 22 are formed consecutively.

The adhesive coating part 22 and the adhesive coating part 23 have different tack strengths from each other, and in some embodiments, the adhesive coating part 22 has higher tack strength than the adhesive coating part 23.

Figure 3:
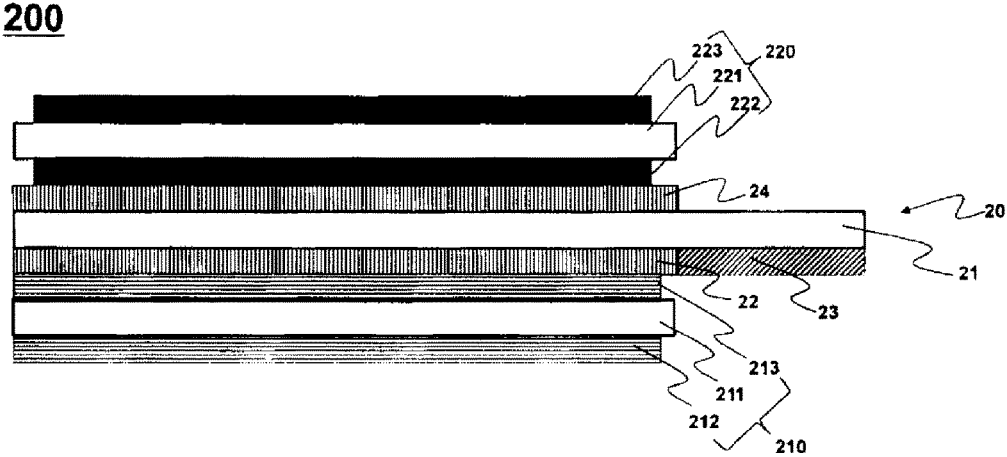
FIG. 3 schematically shows a vertical cross-sectional view of the electrode assembly including the separator of FIG. 2, illustrating components stacked before winding.

FIG. 3 schematically shows a vertical cross-sectional view of the electrode assembly including the separator of FIG. 2, illustrating stacked components before winding.

Referring to FIG. 3, an electrode assembly 200 includes a sheet-like negative electrode 210, a sheet-like positive electrode 220, and a separator 20.

From the lower side, the negative electrode 210, the separator 20, and the positive electrode 220 are stacked in this order.

The negative electrode 210 has a sheet-like structure with negative electrode active material layers 212 and 213 formed respectively on the upper surface and the lower surface of a current collector 211.

The positive electrode 220 has a sheet-like structure with positive electrode active material layers 222 and 223 formed respectively on the upper surface and the lower surface of a current collector 221.

The separator 20 has the same structure as that of the separator of FIG. 2. Specifically, the adhesive coating parts 22 and 23 are formed on the lower surface of the long sheet-like porous substrate 21. The adhesive coating part 22 is formed on a left section of the lower surface of the porous substrate 21, and the adhesive coating part 23 is formed on a right section of the lower surface of the porous substrate. Further, the adhesive coating part 23 and the adhesive coating part 22 are formed consecutively.

The area of the separator 20 is relatively larger than the area of the positive electrode 220 or the negative electrode 210, and specifically, it is as wide as the area of the adhesive coating 23.

The adhesive coating part 22 is adhered on the opposite surface of the negative electrode active material layer 213 of the negative electrode 210, and the adhesive coating part 24 is adhered on the opposite surface of the positive electrode active material layer 222 of the positive electrode 220.

Meanwhile, the coating part 23 does not face the electrode, but forms a winding tip to be wound in advance in order to improve the winding stability at the time of winding the electrode assembly 200.

Figure 4:
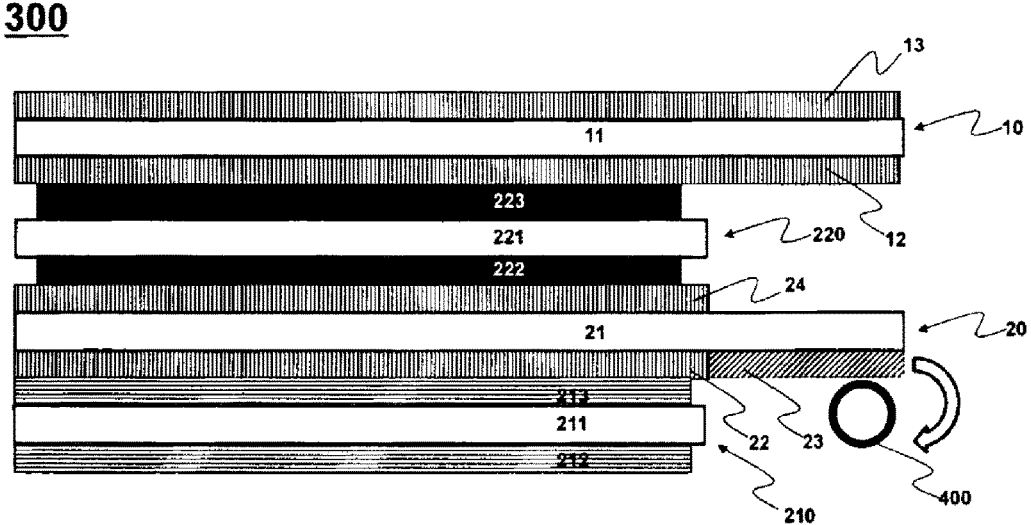
FIG. 4 schematically shows a vertical cross-sectional view illustrating a stacked state of a jelly-roll type electrode assembly before winding, according to another embodiment of the present invention.

FIG. 4 schematically shows a vertical cross-sectional view illustrating a stacked state of a jelly-roll type electrode assembly before winding, according to another embodiment of the present invention.

Referring to FIG. 4 in comparison with FIG. 3, an electrode assembly 300 includes a sheet-like negative electrode 210, a sheet-like positive electrode 220, and separators 10 and 20.

The structures of the positive electrode 220, the negative electrode 210 and the separator 20, and the stacked structure between them are the same as those shown in FIG. 3. The only difference is that Further, the separator 10 is stacked on the upper surface of the positive electrode. Therefore, the electrode assembly 300 is configured such that, from the lower side, the negative electrode 210, the separator 20, the positive electrode 220, and the separator 10 are stacked in this order.

Specifically, the negative electrode 210 has a sheet-like structure in which negative electrode active material layers 212 and 213 are respectively formed on the upper surface and the lower surface of the current collector 211.

The positive electrode 220 has a sheet-like structure in which positive electrode active material layers 222 and 223 are formed respectively on the upper surface and the lower surface of the current collector 221.

The separator 20 has the same structure as that of the separator of FIG. 2. Specifically, the adhesive coating parts 22 and 23 are formed on the lower surface of the long sheet-like porous substrate 21. The adhesive coating part 22 is formed on a left side section of the lower surface of the porous substrate 21, and the adhesive coating part 23 is formed on a right side section of the lower surface of the porous substrate. Further, the adhesive coating part 23 and the adhesive coating part 22 are formed consecutively.

The area of the separator 20 is relatively larger than the area of the positive electrode 220 or the negative electrode 210, and specifically, it is as wide as the area of the adhesive coating part 23.

The separator 10 has the same structure as that of the separator of FIG. 1, and the adhesive coating part 12 is formed overall on the lower surface of the long sheet-like porous substrate 11. The adhesive coating part 13 is formed overall on the upper surface of the porous substrate 11.

The adhesive coating part 22 is adhered on the opposite surface of the negative electrode active material layer 213 of the negative electrode 210, and the adhesive coating part 24 is adhered on the opposite surface of the positive electrode active material layer 222 of the positive electrode 220.

The separator 10 is laminated so that the adhesive coating part 12 faces the upper surface of the positive electrode 220. Using the separator 10 can prevent a contact and short-circuit between the negative electrode active material layer 212 of the negative electrode 210 and the active material layer 223 of the positive electrode 220 after winding.

It is a matter of course that the separator 10 can be replaced by a separator having the same structure as the separator 20.

In order to manufacture a jelly-roll, upon stacking into the electrode assembly 300, winding is carried out in a clockwise direction as indicated by an arrow with a winding core 400 brought into contact with the adhesive coating part 23. First, the separator part not facing the electrode is wound, and subsequently a section of the electrodes and the separator facing each other is wound.

In order to prevent so-called tail out condition in which a part of the separator 20 is pulled out while separating the winding core 400 from the electrode assembly 300 after the winding process, the tack strength of the adhesive coating part 23 is set to be relatively lower than that of the adhesive coating part 22. However, omitting formation of the adhesive coating part from where the separator contacts the winding core 400 in order to simply prevent the tail out condition would disable the winding winding core 400 from adhering to the separator 20 and thus a stable winding cannot be provided. Therefore, the adhesive coating part 23 is set to maintain a proper tack strength.

Hereinafter, the present invention will be described in more detail with reference to experiments conducted.

EXAMPLE

As shown in FIG. 2, a first adhesive coating part having an acrylic pressure sensitive adhesive as a first pressure sensitive adhesive was formed on the first surface of the sheet-like porous substrate, and a second adhesive coating part was formed with PVdF that is a fluorine-based pressure sensitive adhesive. And a third coating part having an acrylic pressure sensitive adhesive was formed as a third pressure sensitive adhesive on the second surface of the sheet-shaped porous substrate to produce a separator.

Comparative Example

A comparative separator was produced in the same manner as in Example, except that the acrylic pressure sensitive adhesive was used as in the first pressure sensitive adhesive into the second pressure sensitive adhesive so as to form the second adhesive coating part.

Experimental Example

A negative electrode, a separator and a positive electrode were stacked to the separators prepared in Example and Comparative Example so that the first coating part faces the negative electrode and the third coating part faces the positive electrode (see FIG. 3). The winding was then carried out with the winding core brought into contact with the second adhesive coating part (see FIG. 4).

From this, it was judged whether or not the separator was defective by confirming the degree of the separator being pulled out when separating the winding core. The results are shown in Tables 1 and 2 below.

Ten jelly-roll type electrode assemblies including the separators according to Example and ten jelly-roll type electrode assemblies including the separators according to Comparative Example were respectively fabricated, and the above experiment was repeated (by the length of the separator portion pulled out, the following marks are indicated: X: no separator pulled out, Δ: less than a half of the length of the winding core, and O: more than a half of the length of the winding core).

TABLE 1

| | Seperator Defect | | Seperator Defect |
|---|---|---|---|
| Example 1-1 | X | Comparative Example 1-1 | O |
| Example 1-2 | X | Comparative Example 1-2 | O |
| Example 1-3 | X | Comparative Example 1-3 | O |
| Example 1-4 | X | Comparative Example 1-4 | Δ |
| Example 1-5 | X | Comparative Example 1-5 | O |
| Example 1-6 | X | Comparative Example 1-6 | Δ |
| Example 1-7 | X | Comparative Example 1-7 | O |
| Example 1-8 | X | Comparative Example 1-8 | Δ |
| Example 1-9 | X | Comparative Example 1-9 | O |
| Example 1-10 | X | Comparative Example 1-10 | O |

TABLE 2

| Classification | Example | Comparative Example |
|---|---|---|
| Defect rate (%) | 0% | 100% |

As shown in Table 1, the jelly-roll type electrode assemblies each including the separators of Examples 1-1 to 1-10 prepared by forming the second coating part with the PVdF adhesive did not cause any defects in the process of separating the winding core, whereas defects were present in all of the jelly-roll type electrode assemblies of Comparative Examples 1-1 to 1-10 each including the separators prepared by forming the second coating portion with the acrylic pressure sensitive adhesive.

Specifically, an inspection of the results marked according to the extent to which the separator was pulled out based on the length of the winding core confirms the following: based on the length of the winding core, the ten electrode assemblies according to Examples had no separators completely pulled out when the winding core was separated. On the other hand, of the 10 electrode assemblies, those according to Comparative Examples 1-4, 1,6 and 1-8 had their separators pulled out by less than a half of the winding core length, while the electrode assemblies in Comparative Examples 1-1, 1-2, 1-3, 1-7, 1-9, and 1-10 had their separators pulled out more than a half of the winding core length.

In the adhesive coating part of the separator, the first and the third adhesive coating parts facing the electrode formed an adhesive coating part having a high tack strength, thereby increasing the tack strength between the electrode and the separator and improving battery longevity and high rate charge/discharge characteristics, and at the same time, a second adhesive coating part having a lower tack strength was formed at a part facing the winding core to remarkably reduce the defective appearance due to the tail out condition of the separator occurred in the process of separating the winding core during the production of the jelly-roll type electrode assembly, and to achieve an increased production yield.

Although the present invention has been described with reference to the drawings, it is to be understood to those skilled in the art that various applications and modifications can be made on the basis of the above disclosure within the range of the present invention.

INDUSTRIAL APPLICABILITY

As described above, in the electrode assembly according to the present invention, the first adhesive coating part and the second adhesive coating part are formed on the first surface of the sheet-like porous substrate, and the first adhesive coating part and the second adhesive coating part include the separator having different tack strengths from each other, whereby providing an increased production yield of the secondary battery while improving the longevity and the high rate charge/discharge characteristics of the secondary battery.

What is claimed is:

1. A jelly-roll type electrode assembly, comprising:
a positive electrode in a sheet-like form;
a negative electrode in a sheet-like form; and
a separator which is interposed between the positive electrode and the negative electrode, and which comprises a first adhesive coating part and a second adhesive coating part formed on a first surface of a sheet-like porous substrate, and a third adhesive coating part formed on a second surface which is the opposite surface to the first surface,
wherein a first pressure sensitive adhesive used as the first adhesive coating part and a second pressure sensitive adhesive used as the second adhesive coating part have different tack strengths from each other,
wherein the adhesive in the first pressure sensitive adhesive and the adhesive in the second pressure sensitive adhesive are different from each other, and
wherein the adhesive in the first pressure sensitive adhesive is an acrylate-based pressure sensitive adhesive, and the adhesive in the second pressure sensitive adhesive is a fluorine-based pressure sensitive adhesive.

2. The electrode assembly according to claim 1, wherein a surface area of the separator facing the positive electrode is larger than a surface area of the positive electrode facing the separator and a surface area of the separator facing the negative electrode is larger than a surface area of the negative electrode facing the separator.

3. The electrode assembly according to claim 1, wherein the first adhesive coating part is wound in a state of being adhered on the surface opposite to the negative electrode, and the second adhesive coating part is wound by the separator itself while forming a winding tip of the electrode assembly.

4. The electrode assembly according to claim 1, wherein the third adhesive coating part is wound in a state of being adhered onto the surface opposite to the positive electrode.

5. The electrode assembly according to claim 1, wherein the electrode assembly is wound so that, based on the separator, the negative electrode is positioned on the inner surface side of the separator.

6. The electrode assembly according to claim 1, wherein the first adhesive coating part has a higher tack strength as compared with the second adhesive coating part.

7. The electrode assembly according to claim 1, wherein the fluorine-based pressure sensitive adhesive is polyvinylidene fluoride (PVdF).

8. The electrode assembly according to claim 1, wherein the third adhesive coating part comprises a third pressure sensitive adhesive, and the third pressure sensitive adhesive is an acrylate-based pressure sensitive adhesive.

9. The electrode assembly according to claim 8, wherein the third pressure sensitive adhesive is the same as the first pressure sensitive adhesive.

10. The electrode assembly according to claim 1, wherein the first adhesive coating part, the second adhesive coating part, and the third adhesive coating part comprise inorganic particles and a pressure sensitive adhesive.

11. The electrode assembly according to claim 10, wherein the first adhesive coating part, the second adhesive coating part, and the third adhesive coating part comprise 10 to 90% by weight of inorganic particles, based on the total weight of the respective parts.

12. The electrode assembly according to claim 1, wherein the second adhesive coating part has a higher content of the inorganic particles as compared with the first adhesive coating part.

13. The electrode assembly according to claim 10, wherein the inorganic particles comprises at least one selected from the group consisting of inorganic particles having piezoelectricity and inorganic particles having lithium ion transferring capability.

14. A secondary battery in which the electrode assembly according to claim 1 is embedded in a battery case together with an electrolytic solution.

15. A battery pack comprising the secondary battery according to claim 14 as a unit cell.

16. A device comprising the battery pack according to claim 15 as a power source.

17. A jelly-roll type electrode assembly, comprising:
a positive electrode in a sheet-like form;
a negative electrode in a sheet-like form; and
a separator which is interposed between the positive electrode and the negative electrode, and which comprises a first adhesive coating part and a second adhesive coating part formed on a first surface of a sheet-like porous substrate, and a third adhesive coating part formed on a second surface which is the opposite surface to the first surface,
wherein the first adhesive coating part and the second adhesive coating part have different tack strengths from each other,
wherein the first pressure sensitive adhesive is an acrylate-based pressure sensitive adhesive which is a polymer of a monomer mixture comprising i) 50 to 90% by weight of a (meth)acrylic acid ester monomer having an alkyl group having 1 to 14 carbon atoms, ii) 1 to 40% by weight of one or more monomers selected from the group consisting of allyl esters, vinyl esters, unsaturated acetate and unsaturated nitrile, and iii) 0.5 to 20% by weight of one or more monomers selected from the group consisting of unsaturated carboxylic acids, based on the total weight of the monomer mixture.

18. The electrode assembly according to claim 17, wherein the monomer mixture further comprises a crosslinking agent, and the crosslinking agent is comprised in an amount of from 0.1 to 3% by weight based on the total weight of the monomer mixture.

19. A separator for a jelly-roll type electrode assembly, the separator comprising a first adhesive coating part and a second adhesive coating part formed on a first surface of a sheet-like porous substrate; and a third adhesive coating part formed on a second surface which is the opposite surface to the first surface,
wherein a first pressure sensitive adhesive used as the first adhesive coating part and a second pressure sensitive adhesive used as the second adhesive coating part have different tack strengths from each other,
wherein the adhesive in the first pressure sensitive adhesive and the adhesive in the second pressure sensitive adhesive are different from each other, and wherein the adhesive in the first pressure sensitive adhesive is an acrylate-based pressure sensitive adhesive, and the adhesive in the second pressure sensitive adhesive is a fluorine-based pressure sensitive adhesive.

20. A method of preparing a jelly-roll type electrode assembly, comprising:
- (a) a step of preparing a separator comprising a first adhesive coating part and a second adhesive coating part formed on a first surface of a sheet-like porous substrate, and a third adhesive coating part formed on a second surface which is the opposite surface to the first surface, wherein a first pressure sensitive adhesive used as the first adhesive coating part and a second pressure sensitive adhesive used as the second adhesive coating part with different tack strengths from each other, wherein the adhesive in the first pressure sensitive adhesive and the adhesive in the second pressure sensitive adhesive are different from each other, and wherein the adhesive in the first pressure sensitive adhesive is an acrylate-based pressure sensitive adhesive, and the adhesive in the second pressure sensitive adhesive is a fluorine-based pressure sensitive adhesive;

- (b) a step of stacking a positive electrode, a separator and a negative electrode so that the first adhesive coating part is positioned to face the negative electrode and the third adhesive coating part is positioned to face the positive electrode through a winding process;
- (c) winding the second adhesive coating part with a winding core brought in contact with the second adhesive coating part; and
- (d) separating the jelly-roll type electrode assembly from the winding core.

* * * * *